United States Patent [19]

Bearcroft

[11] 4,206,642
[45] Jun. 10, 1980

[54] FLOWMETER

[75] Inventor: Kenneth E. Bearcroft, Stortford, England

[73] Assignee: ITT Industries, Inc., New York, N.Y.

[21] Appl. No.: 974,223

[22] Filed: Dec. 29, 1978

[30] Foreign Application Priority Data

Jan. 10, 1978 [GB] United Kingdom ............... 00862/78

[51] Int. Cl.² ............................................... G01F 1/32
[52] U.S. Cl. ............................................... 73/194 VS
[58] Field of Search ..................... 73/194, 653, 517 R; 324/175

[56] References Cited

U.S. PATENT DOCUMENTS

| 3,564,915 | 2/1971 | Tomota et al. | 73/194 |
| 3,796,096 | 3/1974 | Sielaff et al. | 73/194 |
| 3,961,185 | 6/1976 | Bromenshire et al. | 73/517 |

FOREIGN PATENT DOCUMENTS

| 2245950 | 4/1975 | France | 324/175 |
| 44-1905 | 1/1969 | Japan | 73/194 |

Primary Examiner—Herbert Goldstein
Attorney, Agent, or Firm—A. Donald Stolzy

[57] ABSTRACT

A fluid flow sensor of the vortex shedding type. Pressure differentials caused by shed vortices operate a piston system to vary the coupling between a pair of optical fibers thereby modulating light signals passing along the fibers.

1 Claim, 4 Drawing Figures

FLOWMETER

BACKGROUND OF THE INVENTION

This invention relates to flowmeters and, more particularly, to a flowmeter of the type which responds to vortices generated in a flowing fluid by an obstruction to the fluid flow.

PRIOR ART STATEMENT

Various methods exist for the measurement of fluid flow. One technique involves pressure measurements at various points in the flowing fluid which are then used to derive the fluid velocity and/or the total mass or volume flow. Such a technique generally involves expensive pipe fittings such as an orifice plate or a venture tube and cannot be readily applied, for example, to a liquid flowing in an open channel. Furthermore, such arrangements generally require maintenance to achieve sufficient accuracy.

Vortex shedding is a known phenomenon which occurs when a fluid flows past a bluff (i.e., unstreamlined) body. Boundary layers of slow-moving viscous fluid are formed along the outer surface of the body, and because it is not streamlined, the fluid flow cannot follow the contours of the body but becomes detached and is rolled into vortices. A vortex of one rotational sense is shed from one side of the body followed by a vortex of the opposite rotational sense shed from the other side and so on. The rate of vortex shedding is proportional to the flow rate of the moving fluid.

SUMMARY OF THE INVENTION

In accordance with the flowmeter of the present invention, the above-described and other disadvantages of the prior art are overcome by providing a fluid flow sensor device including a housing in the form of a bluff body which, when immersed in a flowing fluid, induces vortex shedding, means responsive to vortex generated pressure differences between two points on the surface of the housing, and fiber optic means for detecting the response of the pressure responsive means.

According to a feature of the invention there is further provided a fluid flow sensor device including a housing in the form of an elongated bluff body adapted to induce vortex shedding when placed in a flowing fluid, a longitudinal bore in the housing communicating with a transverse bore and locating first and second optical fibers arranged to transmit light signals therebetween, means located in the transverse bore and adapted, in response to pressure differentials across the housing surface, to vary the optical coupling between the fibers thereby producing a light output signal modulated at a frequency corresponding to the rate at which vortices are shed.

BRIEF DESCRIPTION OF THE DRAWINGS

In the accompanying drawings which illustrate exemplary embodiments of the present invention.

DESCRIPTION OF THE PREFERRED EMBODIMENT

Figure 1:
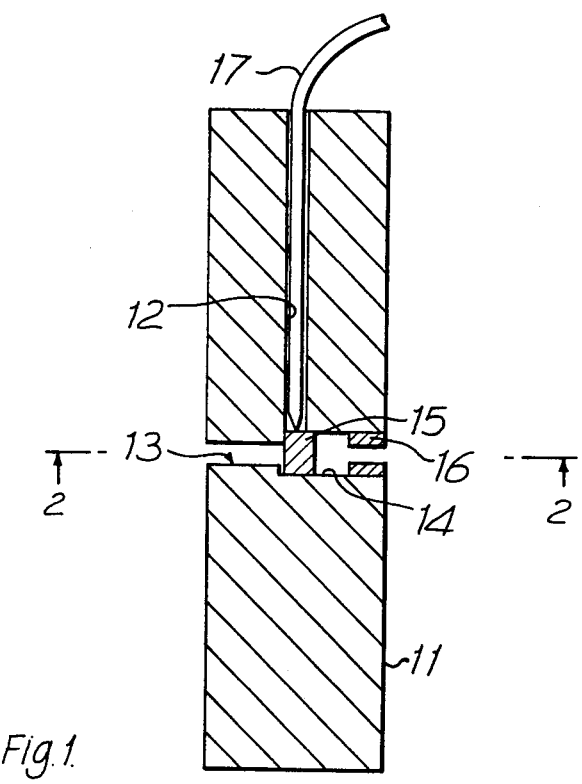
FIG. 1 is a vertical sectional view of a vortex flow sensor taken on the line 1—1 shown in FIG. 2.
Figure 2:
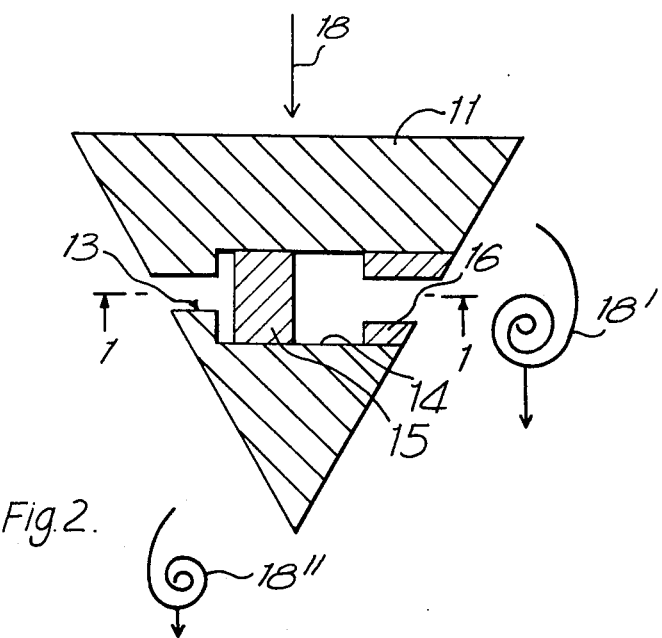
FIG. 2 is a transverse sectional view of the sensor taken on the line 2—2 shown in FIG. 1.

Referring to FIGS. 1 and 2, the sensor includes a prism shaped body 11 which may be made from a metal or a plastic material and which is immersed in a fluid whose flow velocity is to be measured. The body 11 has a vertical bore 12 for about half its length, which bore 12 communicates with a transverse bore 13, a portion 14 of which is enlarged to receive a piston 15. The piston 15 is retained in the enlarged portion 14 of bore 13 by a tubular insert 16.

Bore 12 carries a pair of optical fibers 17 coupled to an optical transmitter and detector system (not shown). The circumference of the piston 15 is polished so that, when the piston is adjacent to the ends of the fibers 17 light transmitted down one fiber is reflected back up the other.

When body 11 is placed in a fluid stream with its vertical axis substantially perpendicular to the flow direction (see arrow 18 in FIG. 2), vortices indicated by arrows 18' are created by interaction of the moving fluid with the flat surfaces and sharp edges of the body 11. The frequency at which vortices are shed from body 11 is a function of the fluid flow velocity.

The vortices shed from body 11 result in pressure differences between the ends of the bore 13 causing the piston 15 to oscillate back and forth with the passage of each successive vortex. This oscillation causes corresponding variations in the optical coupling between the fibers 17. The frequency of this variation is measured by a conventional detector system to provide an indication of the flow velocity of the fluid.

Figure 3:
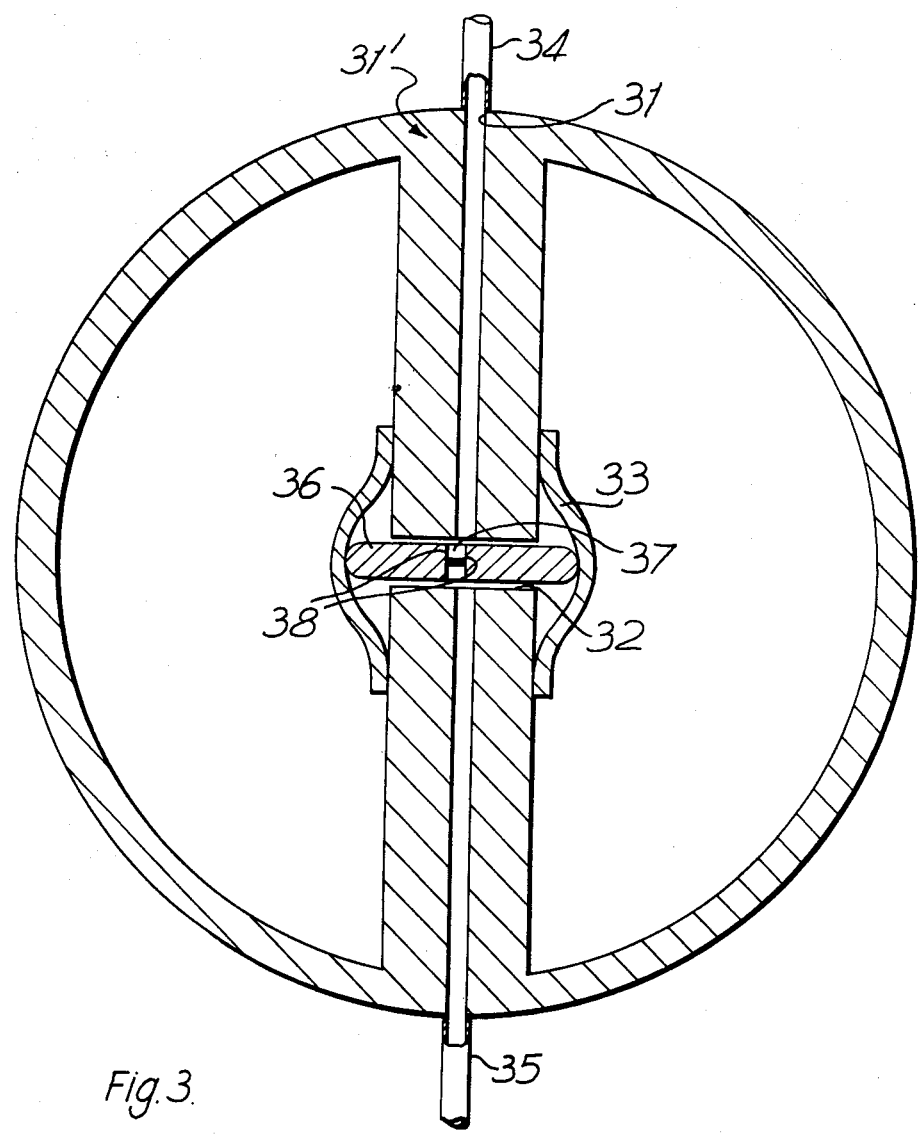
FIGS. 3 and 4 show vertical and transverse sectional views, respectively, of an alternative sensor arrangement.
Figure 4:
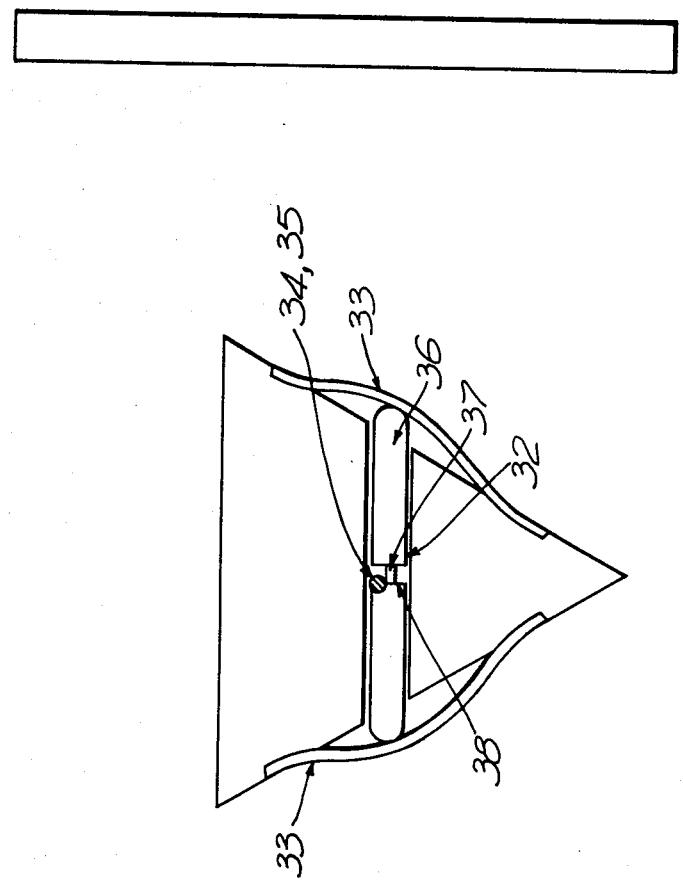

An alternative sensor arrangement is shown in FIGS. 3 and 4. In this arrangement a vertical bore 31 is continued for the full length of a body 31', and communicates with a parallel sided transverse bore 32 the open ends of which are sealed each with a diaphragm 33. The two portions of the bore 31 each contain respective optical fibers 34 and 35, the fibers being coupled as before to a detector and transmitter system.

The diaphragms 33 are coupled together via a rigid shaft having a reduced diameter center portion 37 defined by shoulders 38 and across which the fibers 34 and 35 are coupled when the diaphragms are positioned symmetrically. As before, vortex shedding of a fluid flowing past the housing causes oscillation of the shaft 36 producing corresponding variations in the coupling between the fibers.

The arrangement shown in FIG. 3 can be hermetically sealed from the fluid in which it is immersed thus providing an inert and inherently safe device when employed with hazardous and/or corrosive fluids.

The embodiment of FIGS. 3 and 4 may, if desired, incorporate an optically transparent liquid filling the space between diaphragms 33, such space in any case being hermetically sealed. Implosion of the diaphragms 33 may thus be avoided.

What is claimed is:

1. A fluid flow sensor device comprising: an elongated bluff body adapted to induce vortex shedding when placed in a flowing fluid; a longitudinal bore in said body; a transverse bore in said body communicating with said longitudinal bore; first and second optical fibers arranged to transmit light signals therebetween, said fibers being located in said longitudinal bores; means located in said transverse bore and adapted; in response to pressure differentials across the body surface, to vary the optical coupling between said fibers thereby producing a light output signal modulated at a frequency corresponding to the rate at which vortices are shed, said pressure responsive means including flexible diaphragms located one at each end of said transverse bore; and a rigid shaft located in a position movable in response to diaphragm movement, said shaft being profiled so as to obstruct light signals transmitted between said fibers for a portion of its travel.

* * * * *